United States Patent
Calvez et al.

(10) Patent No.: US 11,059,580 B2
(45) Date of Patent: Jul. 13, 2021

(54) DEVICE FOR SUPPLYING POWER TO A WIRED DRONE

(71) Applicant: ELISTAIR, Champagne au Mont d'Or (FR)

(72) Inventors: Frank Cyril Calvez, Morancé (FR); Marie Marc Hervé Timothée Penet, Lyons (FR); Christian Marie Guilhem De Marliave, Lyons (FR); François Bernard Olivier Dubois, Lyons (FR)

(73) Assignee: ELISTAIR, Champagne au Mont d'Or (FR)

( * ) Notice: Subject to any disclaimer, the term of this patent is extended or adjusted under 35 U.S.C. 154(b) by 0 days.

(21) Appl. No.: 16/233,752

(22) PCT Filed: Jun. 21, 2017

(86) PCT No.: PCT/IB2017/053683
§ 371 (c)(1),
(2) Date: Dec. 27, 2018

(87) PCT Pub. No.: WO2018/002775
PCT Pub. Date: Jan. 4, 2018

(65) Prior Publication Data
US 2020/0091834 A1 Mar. 19, 2020

(30) Foreign Application Priority Data
Jul. 1, 2016 (FR) ...................................... 16/70361

(51) Int. Cl.
*B64C 39/02* (2006.01)
*H02M 7/12* (2006.01)

(52) U.S. Cl.
CPC ...... *B64C 39/022* (2013.01); *B64C 2201/042* (2013.01); *B64C 2201/06* (2013.01); *H02M 7/12* (2013.01)

(58) Field of Classification Search
CPC ............. B64C 39/022; B64C 2201/06; B64C 2201/042; H02M 1/4208; H02M 3/10; H02M 7/12; H02M 3/155
See application file for complete search history.

(56) References Cited

U.S. PATENT DOCUMENTS

| 4,606,074 A | 8/1986 | Rodeffer |
| 6,325,330 B1 | 12/2001 | Lavan |

(Continued)

FOREIGN PATENT DOCUMENTS

| CN | 101847929 A | 9/2010 |
| CN | 103144779 A | 6/2013 |

(Continued)

OTHER PUBLICATIONS

Machine translation of LT6316B, Sep. 12, 2016. Obtained from Espacenet, https://worldwide.espacenet.com/ on Jan. 18, 2020. (Year: 2016).*

(Continued)

*Primary Examiner* — Fred E Finch, III
(74) *Attorney, Agent, or Firm* — Cantor Colburn LLP (57) ABSTRACT

The present invention relates to a device for supplying electrical power to a wired system for a drone (1). The device according to the invention includes at least one power converter (4) on the ground and one power converter (2) at the level of the drone (1), regulation at the level of the converter on the ground ensures that the output voltage of the power converter (4) on the ground increases when the output current of the power converter (4) on the ground increases. The method according to the invention is intended for all wired drones, the wire (3) of which is used to supply electrical power to the drone (1).

19 Claims, 5 Drawing Sheets

(56) References Cited

U.S. PATENT DOCUMENTS

| | | | |
|---|---|---|---|
| 8,444,081 B2* | 5/2013 | Grenier | F03D 15/00 |
| | | | 244/17.11 |
| 8,695,919 B2* | 4/2014 | Shachor | B64C 39/022 |
| | | | 244/17.17 |
| 2007/0200027 A1* | 8/2007 | Johnson | B64C 39/022 |
| | | | 244/3.1 |
| 2009/0134709 A1* | 5/2009 | Sun | H02J 1/08 |
| | | | 307/103 |
| 2010/0181840 A1* | 7/2010 | Coulson | H02J 1/00 |
| | | | 307/103 |
| 2010/0295303 A1 | 11/2010 | Lind et al. | |
| 2011/0037445 A1* | 2/2011 | Ting | G05F 1/573 |
| | | | 323/234 |
| 2012/0062195 A1* | 3/2012 | Ting | H02M 3/156 |
| | | | 323/282 |
| 2014/0167682 A1* | 6/2014 | Peabody | H02J 7/0027 |
| | | | 320/107 |
| 2014/0177303 A1* | 6/2014 | Goerke | H02M 3/33507 |
| | | | 363/89 |
| 2015/0354539 A1 | 12/2015 | Goessling et al. | |
| 2016/0254752 A1* | 9/2016 | Wood, III | G06F 1/305 |
| | | | 363/15 |
| 2016/0357204 A1* | 12/2016 | Lu | H02M 3/156 |
| 2017/0003326 A1* | 1/2017 | Lewis | G01R 19/2503 |

FOREIGN PATENT DOCUMENTS

| | | | | |
|---|---|---|---|---|
| CN | 16233752 A | | 12/2013 | |
| CN | 105270637 A | * | 1/2016 | |
| CN | 105270637 A | | 1/2016 | |
| CN | 205060039 U | | 3/2016 | |
| LT | 6316 B | * | 9/2012 | B64C 29/00 |
| WO | 2013013219 A1 | | 1/2013 | |
| WO | 2016059953 A1 | | 4/2016 | |

OTHER PUBLICATIONS

English abstract of LT2014152A, originally published Jul. 11, 2016 (original document unavailable). Translation obtained from Espacenet, https://worldwide.espacenet.com/ on Jan. 18, 2020. (Year: 2016).*
"Voltage regulation," article from Wikipedia, edited Mar. 20, 2020. Retrieved from https://en.wikipedia.org/w/index.php?title=Voltage_regulation&oldid=946532018 on Jul. 6, 2020. (Year: 2020).*
Search Report for PCT/IB2017/053683.
Written Opinion for PCT/IB2017/053683.
First Office Action for Application No. 201780039725.3.
English Translation for First Office Action for Application No. 201730039725.3.
First Search for Application No. 201780039725.3.

* cited by examiner

DEVICE FOR SUPPLYING POWER TO A WIRED DRONE

CROSS REFERENCE TO RELATED APPLICATIONS

This application is a National Stage of PCT Application No. PCT/IB2017/053683 filed on Jun. 21, 2017, which claims priority to French Patent Application No. 16/70361 filed on Jul. 1, 2016, the contents each of which are incorporated herein by reference thereto.

TECHNICAL FIELD OF THE INVENTION

The invention concerns a power supply device allowing maximizing the electric power transmitted by a wired system for supplying power to rotating wing drones, the drone being connected to the ground by a wire. A drone designates a flying apparatus remotely operated by means of a control device. The drones called rotating wing drones comprise all known forms of reduced helicopter models. The wire concerned by the invention has at least the function of supplying electric power to the drone. The wire thus includes at least two electric power supply strands. The wire often has other functions. For example, another function of the wire may be the transfer of data, for example via an optical fiber or the technique known as Power-Line Communication. The wire must have suitable mechanical characteristics: it often includes an aramid strand that provides high tensile strength. The wire may include any other strand, so as to transfer something between the ground and the drone. All these strands are generally joined in a sheath, the sheath constituting the exposed portion of the wire.

At the mechanical level, a wired system for a drone often includes a ground base, a wire, and a device for hooking the wire to the drone. The ground base generally includes a winding drum of the wire, a motor allowing rotating the drum. The wired system may also be reduced to its simplest form, that is to say a wire connected on one side to the drone and on the other side to the ground.

A device for supplying power to a wired system generally comprises:
- a device for plugging to an external source of electric energy, for example a ground battery, or the electric power grid,
- a power converter which converts the current-voltage couple of the external source to a current-voltage couple which flows in the wire,
- a wire as previously described,
- a power converter on the drone that allows converting the current-voltage couple flowing in the wire into the current-voltage couple usable by the drone.

This power converter is selected to be as light as possible, to increase the payload of the drone.

PRIOR ART

To increase the range of wired drones and their payload, the lightest possible power supply strands, and hence the finest possible, are generally used. The counterpart of the fineness of the strands is heat-up of the wire when the current traversing the strands is high. This heat-up may lead to a deterioration of the wire at too high current. In the case where the wire is wound on a drum, the deterioration generally takes place at the level where the wire is wound, especially if it is wound on several thicknesses. The portion of the wire that is unwound is rarely damaged because it is cooled by the ambient air. Generally, a ground base provided with a winding drum of the wire is provided with a fan for cooling the wire wound on the drum.

To increase the power delivered to the drone, we manage to select a current-voltage couple traversing the wire such that the current is low, and the voltage is high. Thus the power converter located on the ground generally increases the voltage, whereas the converter located on the drone lowers the voltage.

In general, the power converter of the ground base delivers a fixed voltage to the wire. The voltage at the input of the power converter of the drone decreases especially as the current traversing the wires is high, because of Ohm's law and the resistance of the electric strands of the wire. The drawbacks of this fixed voltage at the output of the power converter of the ground base are twofold:

1. At high power, the power converter of the drone is supplied with a lower voltage than at low power: the power converter placed on the drone does not work at its optimal efficiency point over the entire power range, 2. At high power, the voltage drop at the input of the power converter of the drone may possibly lead to the stoppage of the operation of drone because the voltage falls below the operating threshold of the drone or of the power converter of the drone.

DISCLOSURE OF THE INVENTION

The power supply device according to the invention overcomes these drawbacks and increases the maximum power of use of the drone.

According to a first feature, the power supply device includes at least one power converter on the ground and a power converter on the drone.

According to a second feature, a regulation of the power converter on the ground ensures that the voltage $U_B$ delivered by the power converter on the ground increases when the current $I_B$ delivered by the power converter on the ground increases, and this over the power range of normal use of the drone.

USEFUL NOTATIONS TO UNDERSTAND THE VARIATIONS OF THE INVENTION AND USED THROUGHOUT THE DOCUMENT $U_B$ designates the voltage at the output of the power converter on the ground.

$I_B$ designates the current at the output of the power converter on the ground. $I_B$ therefore flows in the power supply strands of the wire, and is the power supply current of the power converter on the drone.

$R_F$ designates the resistance of the wire, that is to say the resistance of the two power supply strands of the wire.

$T_F$ designates the temperature of the wire, $T_A$ designates the ambient temperature.

$U_D$ designates the voltage at the input of the power converter of the drone.

$P_M$ designates the effective power available for the motors of the drone.

VARIATIONS OF THE INVENTION

According to variations of the invention,
the regulation compensates the voltage drop between the output of the power converter on the ground and the input of the power converter of the drone, due to the resistance $R_F$ of the wire, the regulation ensures a constant voltage $U_D$ at the input of the power converter on the drone, close to the optimal operating voltage of the power converter on the drone, the voltage $U_B$ delivered by the power converter on the ground increases linearly with the current, according to an affine law of the type $U_B=U_0+R_B I_B$ where $U_0$ designates a constant voltage, close to the optimal power supply voltage of the power converter of the drone, and $R_B$ designates a constant approximately equal to the resistance $R_F$ of the wire, the previous constant $U_0$ is replaced by a function $U_0(I_B)$, such that this function is close to the function that describes the optimal power supply voltage of the power converter of the drone as a function of the power supply current, the variation of the resistance $R_F$ of the power supply strands of the wire with the temperature is taken into account, for example by measuring the temperature of the wire in one or several location(s), or measuring the ambient temperature, or both, the resistance $R_F$ of the wire is reevaluated regularly using the measurements of $U_B$, $U_D$, $I_B$ and Ohm's law, the regulation is based on a servo-control of the first-order servo-controls class or allowing not to obtain excessive oscillations of the voltage, even following a sudden variation of the power consumed by the drone, a circuit on the drone, interposed between the wire and the power converter of the drone, includes at least one capacitive-type element and absorbs the voltage variations during a sudden variation in the power consumed by the drone, the power converter at the level of the drone has a fixed ratio, $U_B$ is servo-controlled directly to the measurement of $U_D$, the value of $U_D$ being transmitted via the wire.

the regulation maximizes the ratio $P_M/T_F$ or, which is equivalent, the ratio $P_M/I_B$, $P_M$ designating the power available for the motors of the drone, $T_F$ the temperature of the wire, and $I_B$ the current flowing in the wire.

SUMMARY DESCRIPTION OF THE FIGURES

FIG. 3a represents the current $I_B$ in Ampere as a function of time in seconds. This current doubles suddenly at an instant called t.

FIGS. 3b, 3c, 3d represent the reactions as a function of time of three different power supply devices according to the principle illustrated in FIG. 2b. For these three figures, we find in full line the voltage $U_B$ as a function of time in seconds and in dotted line the voltage $U_D$ as a function of time in seconds.

FIG. 3b corresponds to a device whose servo-control corresponds to a second-order system. It can be seen that the voltage $U_D$ varies strongly just after the instant t, which could lead to a major malfunction, either by overvoltage or under-voltage.

FIG. 3c corresponds to a device whose servo-control corresponds to a first-order system. It can be seen that the voltage $U_D$ also varies strongly just after the instant t but there is no oscillation. The only possible malfunction is under-voltage.

FIG. 3d corresponds to the same device as in FIG. 3c but was added immediately upstream of the power converter (2) of the drone (1) a small capacity to cope with voltage variations and to smoothen $U_D$.

FIG. 4a represents the current $I_B$ in Ampere as a function of time in seconds. This current is suddenly divided by 2 at an instant called t.

FIGS. 4b and 4c represent the reactions as a function of time of two different power supply devices according to the principle illustrated in FIG. 2b. For these two figures, we find in full line the voltage $U_B$ as a function of time in seconds and in dotted line the voltage $U_D$ as a function of time in seconds.

FIG. 4b corresponds to the same device as that of FIG. 3c, and FIG. 4c corresponds to the same device as that of FIG. 3d.

It can thus be seen that the device of FIG. 3d or 4c is optimal for the operation of the system.

DETAILED DESCRIPTION

The ways of achieving the invention and their variants which follow illustrate precisely the invention and are not limiting other ways of achieving the power supply device according to the invention.

An optimal embodiment of the power supply device according to the invention is achieved as follows.

Figure 1:
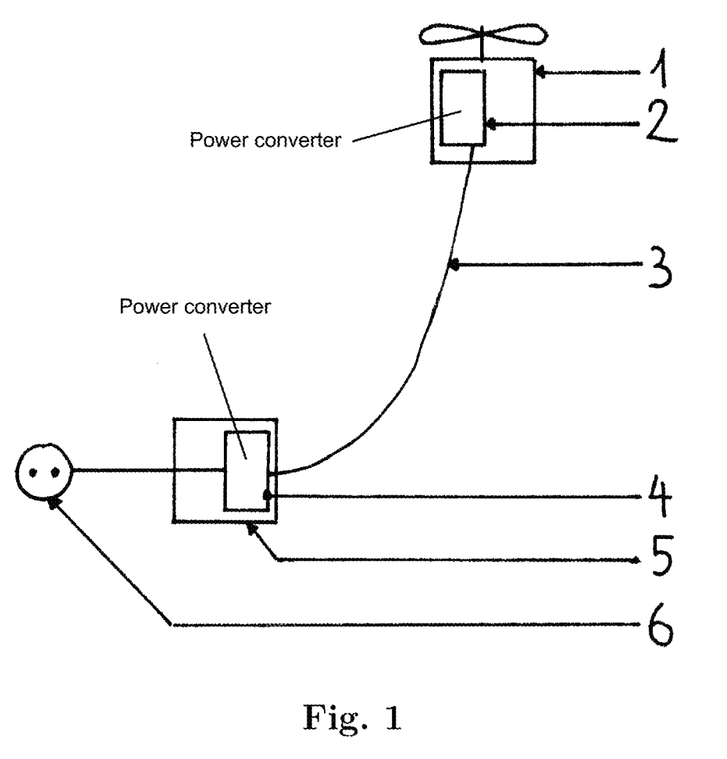
FIG. 1 represents a drone (1) provided with a power converter (2) connected by a wire (3) to a ground base (5) provided with a power converter (4) connected to the mains grid (6).
Figure 2:
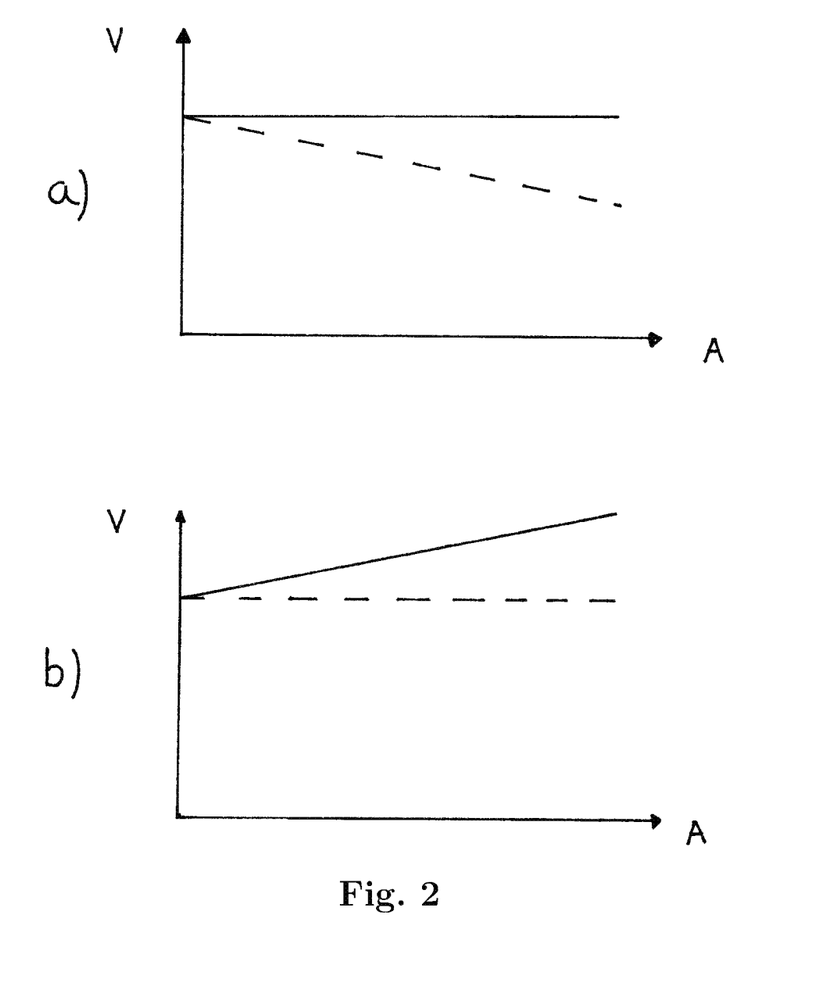
FIG. 2 allows comparing the voltages $U_B$ and $U_D$ as a function of the current $I_B$ for a conventional power supply device (FIG. 2a) and a power supply device according to a particular embodiment of the invention (FIG. 2b). In full line, the voltage $U_B$ in Volt is represented as a function of the current $I_B$ in Ampere, in dotted line the voltage $U_D$ in Volt as a function of the current $I_B$ in Ampere. It can be seen that the voltage $U_D$ available for the drone (1) drops with the power demanded for a conventional power supply device, whereas the voltage $U_D$ available for the drone (1) remains constant regardless of the power demanded for the power supply device according to a particular embodiment of the invention.
Figure 3:
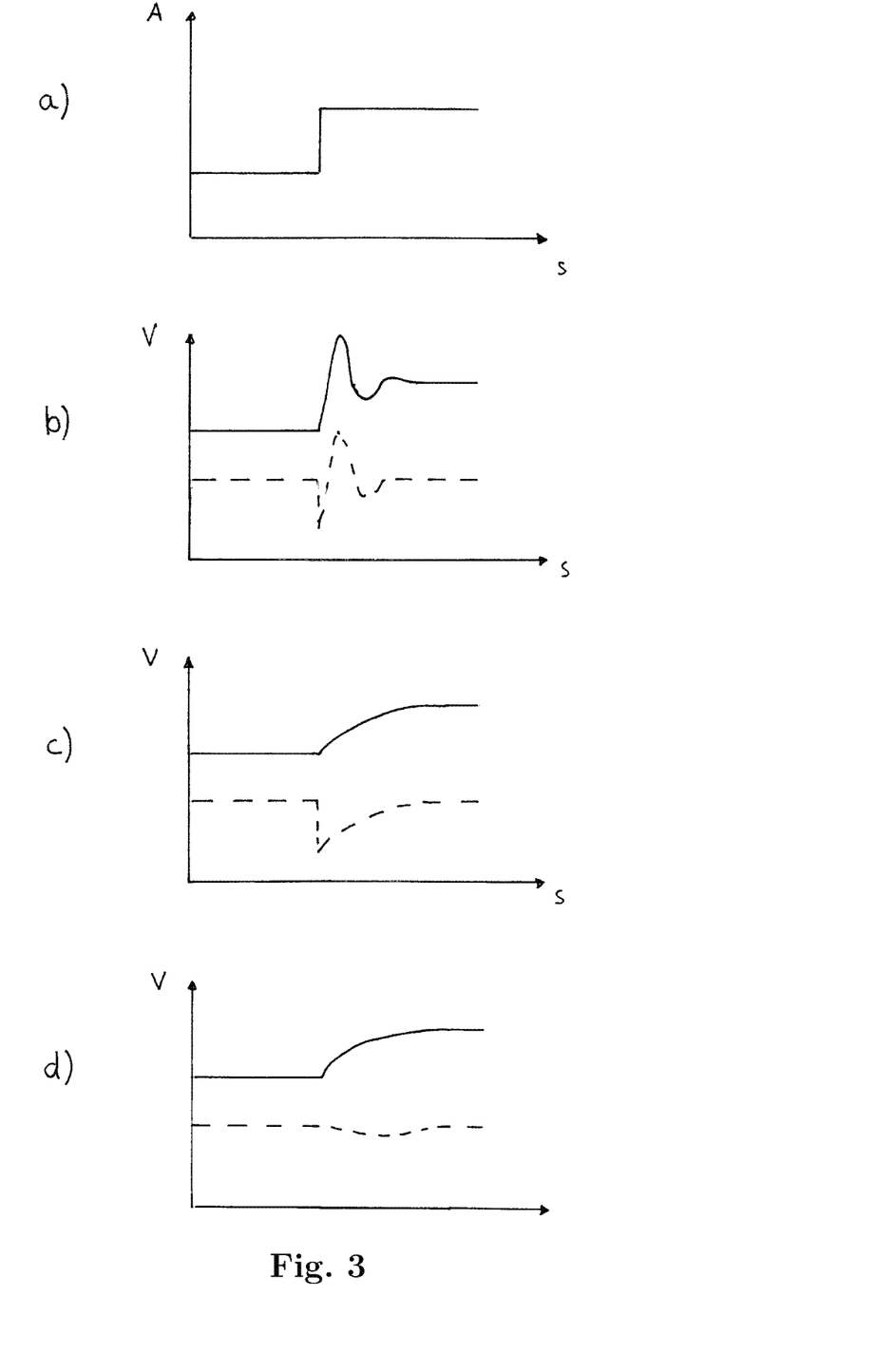
FIG. 3 illustrates the reaction of different power supply devices according to the invention when the power of the drone (1) increases suddenly.
Figure 4:
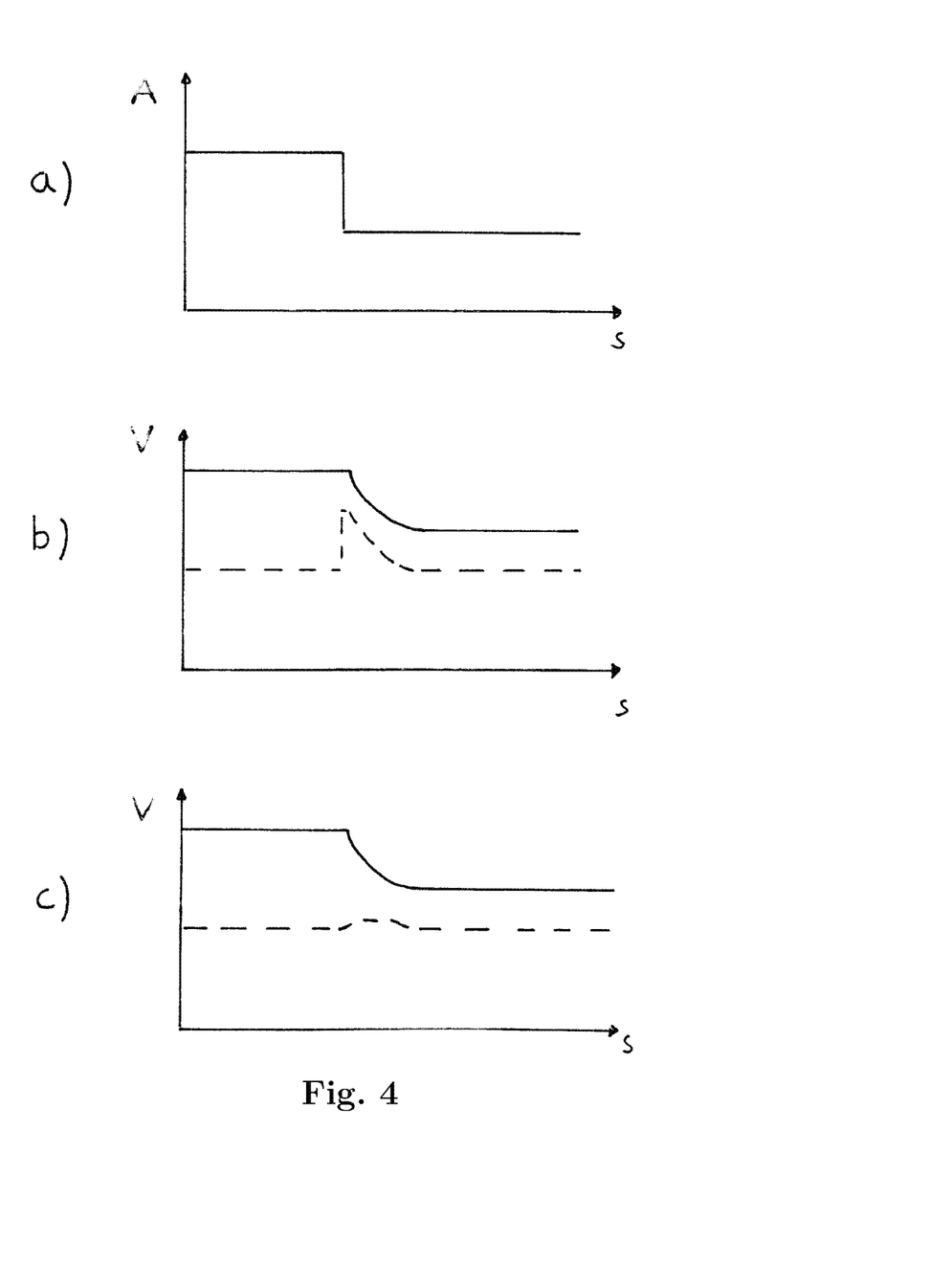
FIG. 4 illustrates the reaction of different devices according to the invention when the power of the drone (1) decreases suddenly.
Figure 5:
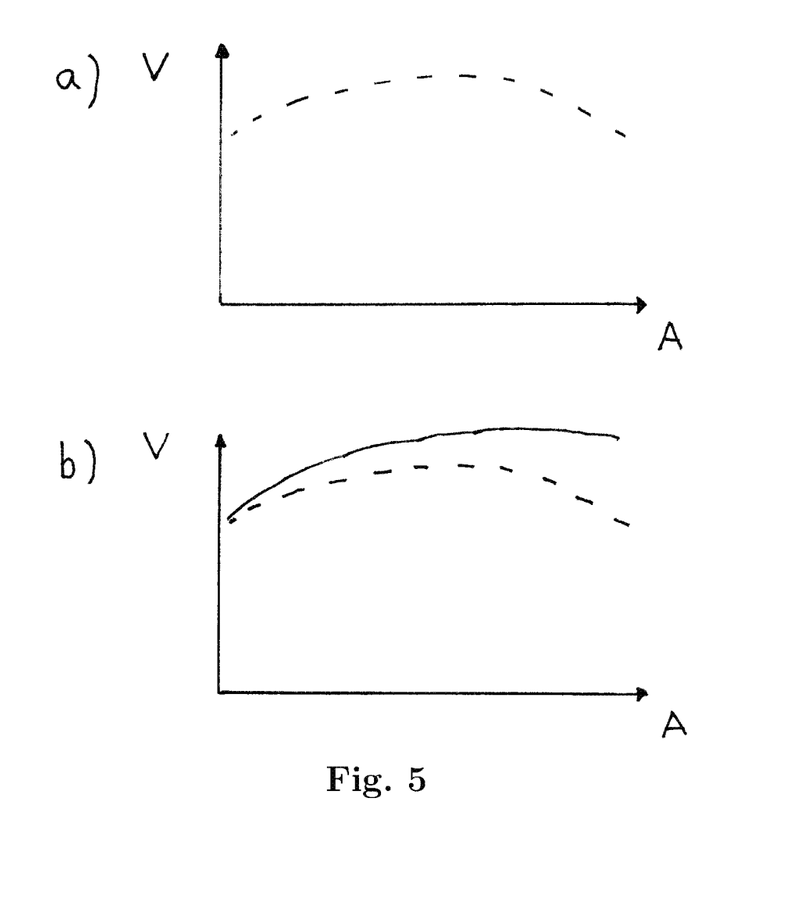
FIG. 5a represents, in dotted line, the power supply voltage $U_D$ which ensures a maximum efficiency of a power converter (2) located on the drone (1) as a function of the current $I_B$ which traverses the wire (3). It can be seen here that the optimal voltage $U_D$ varies considerably with the input current $I_B$.
FIG. 5b represents in full line the voltage $U_B$ delivered by a power supply device according to the invention which allows obtaining the optimal voltage $U_D$ to offer the drone (1) a maximum power as a function of the current $I_B$.

A drone (1) with a maximum power of 2600 W supplied with 25V direct voltage is used. This drone (1) has a power converter (2) with a $\frac{1}{16}$ fixed ratio connected to a wire or cable. This wire or cable, 100 m length, is constituted by two electric strands, an aramid strand, all in a plastic sheath. The resistance of the used electric strands is 0.06 ohm per meter. This wire or cable (3) is connected to a power converter (4) in a ground base (5). The converter of the ground base (5) is supplied by the mains grid (6) with 230V alternating voltage. The ground base (5) includes a winding drum of the wire, a motor connected to the winding drum of the wire or cable (3) for winding or unwinding the wire or cable (3). A fan cools the winding drum of the wire (3). A temperature sensor is present on the winding drum of the wire (3) to prevent the user from possible overheating of the wound wire (3).

The drone (1) has various on-board instruments and communicates in real-time with the ground base (5) through the technique called Power-Line Communication, well known to those skilled in the art. The information therefore passes via the power supply strands.

The power converter (2) at the level of the drone (1) has its maximum efficiency point at about 400V, requires not exceeding 410V at the input, otherwise it stops operating, and also requires never being supplied at more than 480V under penalty of irreparable damage. This power converter (2) being with a 1/16 fixed ratio, it outputs a 25V voltage for an input voltage equal to 400V.

The power converter (4) at the level of the ground base (5) uses the so-called Power Factor Correction technique, well known to those skilled in the art. The power controller is modified so that the output voltage $U_B$ follows the law expressed in Volt $U_B$=min (400+$R_B I_B$, 480) where $I_B$ is the output current of the power converter (4) expressed in Ampere, and $R_B$ a constant expressed in Ohm, in our case equal to 12, which one has been selected equal to $R_F$ the resistance of the wire. To obtain such a law, the modification of the power controller requires simple electronic components such as diodes, resistors, current sensors at the output of the converter, analog multipliers. Particular care is taken to ensure that the components are adjusted in such a way that the regulation, in case of sudden power variations, ensures that the voltage does not undergo oscillations. Thus, the voltage at the level of the power converter (2) of the drone (1) does not exceed 410V which would cause the converter of the drone (1) to stop and the drone (1) to fall. The selection and the way in which the components are adjusted are known to those skilled in the electronics industry and do not require further explanation.

At the input of the power converter (2) of the drone (1), the voltage $U_D$ is equal to $U_B$ minus the ohmic losses in the wire (3) namely min (400+$R_B I_B$, 480)–$R_F I_B$ Volts. Thus, as long as $I_B$ does not exceed 80/12=6.7 A, the voltage $U_D$ is almost constant and equal to 400V.

Based on the heat-up of the wires at the level of the ground base (5), it is estimated that the current flowing in the wires should not exceed 6.7 A in continuous operation mode. The maximum power available for the drone (1) in continuous operation mode is therefore equal to 400*6.7=2700 W at the input of the power converter (2) of the drone (1), and the maximum power at the output of the power converter (2) of the drone (1) is equal to about 2600 W. With a conventional 400V fixed voltage power supply at the level of the ground base (5), the maximum available power would be only 320*6.7=2150 W at the input of the power converter (2) of the drone (1), and only 1800 W at the output of the power converter (2) because the efficiency is not optimal at 320V.

With our device according to the invention, a gain in power of 45% is thus obtained on the maximum power supplied to the drone (1) in continuous operation mode compared to a conventional system, and especially with equal heat-up of the wires.

In the embodiment of the device according to the preceding invention, the variation of the resistance $R_F$ of the power supply strands with temperature is not taken into account. The power supply strands of this first embodiment are made of copper, and the resistivity of copper varies with temperature: the resistivity increases by about 50% between −20 degrees Celsius and 70 degrees Celsius. To take into account the change of resistance $R_F$ of the wire (3) as a function of the temperature, two variations of the embodiment are possible.

The first variation of the first embodiment according to the invention consists in using the information of the temperature sensor on the winding drum of the wire. The temperature measured by this sensor is called $T_F$. In addition, a revolution counter on the winding drum of the wire (3) allows knowing the length l of the wire (3) still wound on the drum. Finally, a temperature sensor on the ground base (5) allows estimating the temperature $T_A$ of the ambient air. We notice then that the resistance RE of the wire (3) is a function f of $T_A$, $T_F$, and l: $R_F$=f ($T_A$, $T_F$, l), a function that has been determined theoretically and experimentally verified. The output law of the power converter (4) is then replaced by the law $U_B$=min ($U_B$–f($T_A$, $T_F$, l) $I_B$, 480).

The second variation of the embodiment according to the invention consists in measuring regularly, every minute, $U_D$ the voltage at the input of the power converter (2) located on the drone (1), $U_B$ the voltage at the output of the power converter (4) of the ground base (5), and $I_B$ the current flowing in the wire. The measurement of $U_D$ is sent to the ground base (5) via the power-line communication technique. The resistance $R_F$ of the power supply strands of the wire (3) is then reevaluated by the Ohm law, by dividing the difference $U_B$–$U_D$ by $I_B$, and the regulation regulates according to the law min(400+$R_F$I, 400).

Another variation of the embodiment of the invention consists in carrying out a software-type rather than electronic voltage regulation of $U_B$ as previously described.

A third variation of the embodiment according to the invention consists in regulating $U_B$ directly on the measured value of $U_D$, this then requires a measurement of $U_D$ at high frequency, very significantly higher than one Herz, preferably in the range of a dozen kilohertz.

The ways of achieving the invention and their variants disclosed in the foregoing illustrate precisely the invention and are not limiting other ways of achieving the power supply device according to the invention.

POSSIBILITIES OF INDUSTRIAL APPLICATIONS

The power supply system according to the invention is capable of supplying power to all wired drones to the extent that it allows increasing the range and the payload compared to existing power supply systems.

The invention claimed is:
1. A device for supplying power to a wired drone, including at least:
   a ground based power converter,
   a power converter at a level of the drone,
   a cable connecting the power converters and,
wherein a regulation of the ground based power converter ensures that a voltage $U_B$ delivered by the ground based power converter increases when a current $I_B$ delivered by the ground based power converter increases, and the voltage $U_B$ occurs over a power range of normal use of the drone and wherein the regulation of the ground based power converter ensures a voltage $U_D$ at an input of the power converter at the level of the drone, is close to an optimal operating voltage of the power converter at the level of the drone, wherein the power converter at the level of the drone has a fixed ratio of output voltage with respect to the voltage $U_D$ at the input of the power converter at the level of the drone.

2. The device according to claim 1, wherein the regulation of the ground based power converter compensates at least partially a voltage drop between an output of the ground based power converter and the input of the power converter at the level of the drone, due to a resistance $R_F$ of the cable.

3. The device according to claim 2, wherein the voltage $U_B$ delivered by the ground based power converter increases linearly with the current $I_B$, according to an affine law $U_B = U_0 + R_B I_B$ where $U_0$ designates a constant voltage, close to the optimal operating voltage of the power converter at the level of the drone, and $R_B$ designates a constant approximately equal to the resistance $R_F$ of the cable.

4. The device according to claim 1, wherein the voltage $U_B$ delivered by the ground based power converter increases linearly with the current $I_B$, according to an affine law $U_B = U_0 + R_B I_B$ where $U_0$ designates a constant voltage, close to the optimal operating voltage of the power converter at the level of the drone, and $R_B$ designates a constant approximately equal to a resistance $R_F$ of the cable.

5. The device according to claim 1, wherein the voltage $U_B$ delivered by the ground based power converter increases linearly with the current $I_B$, according to an affine law $U_B = U_0 + R_B I_B$ wherein $U_0$ is defined by a function $U_0(I_B)$, such that this function is close to a function that describes the optimal operating voltage of the power converter at the level of the drone as a function of the current $I_B$ and $R_B$ designates a constant approximately equal to a resistance $R_F$ of the cable.

6. The device according to claim 1, wherein a variation of a resistance $R_F$ of power supply strands of the cable with temperature is taken into account, by measuring a temperature of the cable in one or several location(s), or measuring an ambient temperature, or both.

7. The device according to claim 1, wherein a resistance $R_F$ of the cable is reevaluated regularly using measurements of $U_B$, $U_D$, $I_B$ and Ohm's law.

8. The device according to claim 1, wherein the regulation of the ground based power converter prevents oscillations of a voltage in the power converter at the level of the drone or the ground based power converter.

9. The device according to claim 1, wherein a circuit on the drone, interposed between the cable and the power converter at the level of the drone, includes at least one energy storage device and absorbs voltage variations during a sudden variation in a power consumed by the drone.

10. The device according to claim 1, wherein $U_B$ is servo-controlled directly to a measurement of a voltage $U_D$ at the input of the power converter at the level of the drone, a value of the voltage $U_D$ being transmitted via the cable.

11. The device according to claim 1, wherein the regulation of the ground based power converter maximizes a ratio $P_M/T_F$ or a ratio $P_M/I_B$, wherein $P_M$ designates a power available for motors of the drone, and $T_F$ is a temperature of the cable.

12. The device according to claim 1, wherein the voltage $U_B$ delivered by the ground based power converter increases linearly with the current $I_B$, according to an affine law $U_B = U_0 + R_B I_B$ wherein $U_0$ is defined by a function $U_0(I_B)$, such that this function is close to a function that describes the optimal operating voltage of the power converter at the level of the drone as a function of a power supply current of the power converter at the level of the drone and $R_B$ designates a constant approximately equal to a resistance $R_F$ of the cable.

13. The device according to claim 12, wherein a variation of the resistance $R_F$ of power supply strands of the cable with temperature is taken into account, by measuring a temperature of the cable in one or several location(s), or measuring an ambient temperature, or both.

14. The device according to claim 13, wherein the resistance $R_F$ of the cable is reevaluated regularly using measurements of $U_B$, $U_D$, $I_B$ and Ohm's law.

15. The device according to claim 14, wherein the regulation of the ground based power converter prevents oscillations of a voltage in the power converter at the level of the drone or the ground based power converter.

16. The device according to claim 1, wherein the fixed ratio of output voltage of the power converter at the level of the drone is 1/16.

17. The device according to claim 16, wherein the power converter at the level of the drone has a maximum efficiency point at about 400V.

18. The device according to claim 15, wherein the fixed ratio of output voltage of the power converter at the level of the drone is 1/16.

19. The device according to claim 18, wherein the power converter at the level of the drone has a maximum efficiency point at about 400V.

* * * * *